(12) United States Patent  
Watanabe

(10) Patent No.: US 7,395,551 B2  
(45) Date of Patent: Jul. 1, 2008

(54) METHOD AND APPARATUS FOR MANAGING SOFTWARE USE

(75) Inventor: Kazuo Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 1507 days.

(21) Appl. No.: 09/735,760

(22) Filed: Dec. 13, 2000

(65) Prior Publication Data

US 2002/0129265 A1    Sep. 12, 2002

(30) Foreign Application Priority Data

Dec. 20, 1999    (JP)    ............................... P11-361221

(51) Int. Cl.  
  *G06F 12/14*    (2006.01)  
  *G06F 11/30*    (2006.01)  
  *H04L 9/00*    (2006.01)

(52) U.S. Cl. .................. 726/27; 713/192; 713/193; 705/55

(58) Field of Classification Search ......... 713/200–202, 713/192–193; 705/55; 726/27  
See application file for complete search history.

(56) References Cited

U.S. PATENT DOCUMENTS

| | | | | |
|---|---|---|---|---|
| 4,458,315 A | * | 7/1984 | Uchenick | .................... 713/200 |
| 5,758,069 A | * | 5/1998 | Olsen | ......................... 713/201 |
| 5,790,664 A | * | 8/1998 | Coley et al. | ................. 709/203 |
| 6,058,477 A | | 5/2000 | Kusakabe et al. | ........... 713/169 |
| 6,126,077 A | | 10/2000 | Tanaka et al. | ................ 235/492 |
| 6,343,280 B2 | * | 1/2002 | Clark | .......................... 705/55 |
| 6,523,119 B2 | * | 2/2003 | Pavlin et al. | ................. 713/192 |

* cited by examiner

*Primary Examiner*—Emmanuel L Moise  
*Assistant Examiner*—Michael Pyzocha  
(74) *Attorney, Agent, or Firm*—Sonnenschein Nath & Rosenthal LLP

(57) ABSTRACT

A method of managing software use in a desired mode and with ease of handling upgrades or other changes includes a sales company or other software provider adding a password to software, inserting identification information into a dongle, and distributing the same to users. A secret key and an open key are prepared and the open key is transmitted to the user. When the user tries to obtain a license, the password is sent to the sales company. The sales company detects identification information based on the password, encodes the same by using the secret key, and sends the same to the user as encoded license information. The user decodes the encoded license information by the open key and matches the same against the identification information included in the dongle. If the information match, the software effectively starts up, while if not, the execution of the software is stopped.

10 Claims, 6 Drawing Sheets

METHOD AND APPARATUS FOR MANAGING SOFTWARE USE

BACKGROUND OF THE INVENTION

1. Field of the Invention

The present invention relates to a method of managing software that prevents illegal use of software such as computer programs and allows only appropriate users to use it and a system therefore.

2. Description of the Related Art

It is important to prevent illegal copying and illegal forging of software such as computer programs and to be able to distribute the software in a state where only appropriate users authorized to use it can use it. In the past, methods of using a password and methods of using a dongle or IC card have been adopted as countermeasures against such illegal use.

The former methods prevent the software from effectively operating without password input for the software at the start of operation of the software. This is realized by matching the input password against a pre-registered password in the software. Note that a secret key, e.g., is used as the password in many cases.

The latter methods distribute a dongle or IC card together with the software to match an identifier of the software with an identifier written in the dongle or IC card at the start of operation of the software. A secret key, e.g., is also normally used for the identifier. In this method, even if secret information in the software is deciphered, since it is impossible to use the software without the dongle or IC card, it can be said that it is a method of higher safety.

In the above method of using a password, the password (secret key) itself which is supposed to be managed so as not to be leaked may nonetheless be intentionally or accidentally divulged to someone other than the appropriate user, and the software may then be illegally used. In actuality, such illegal use often occurs.

Also, even in the method of using a dongle or IC card, forging and copying of the dongle or IC card may be possible in some circumstances. There is a possibility that the software will be illegally used by forging and copying. Also, in this method, the dongle or IC card has to be re-distributed in accordance with software upgrades or other modifications to the software. Thus, the method has the disadvantage that processing becomes troublesome and costly.

Accordingly, an object of the present invention is to provide a method of managing software that can manage software use with a high level of safety, while enabling upgrades and changes to the software to be easily handled.

Another object of the present invention is to provide a software management system that can manage software use with a high level of safety, while enabling upgrades and changes to the software to be easily handled.

SUMMARY OF THE INVENTION

In accordance with the above objects, a method of managing software is provided including the step of provider encoding of the software to be provided to a user with information storage means prepared corresponding to the software for providing instructions to an apparatus for running the software, which information storage means is capable of being accessed by the apparatus in a connected state. The method further includes a step of storing predetermined first information inside the information storage means for each corresponding piece of software, wherein second information to be matched against the first information is stored in the information storage means by using a secret key of an open key encoding format. Further steps include transmitting the encoded second information to the software user and having the software user decode the transmitted encoded second information by using the open key of the open key encoding format. Other steps include reading the first information from the information storage means, and then matching the first information against the decoded second information, and enabling use of the software when the information match.

In further accordance with the above objects, an apparatus for managing software is provided including information storage means for storing distributed software to be used and for storing predetermined first information for each of the stored software, the information storage means being accessibly connected via predetermined interface means. The apparatus also includes transmitting means for transmitting third information identifying software to a software provider when seeking authorization of use of the stored software, and receiving means for receiving information transmitted by the software provider including second information to be matched against the first information, wherein the second information is generated based on the third information encoded using an open key of an open key encoding format. The apparatus further includes decoding means for decoding the received encoded second information by using the open key of the open key encoding format, and matching means for matching the first information stored in the information storage means against the decoded second information. The apparatus also includes execution control means for enabling the software to be used when the information match.

DETAILED DESCRIPTION OF THE PREFERRED EMBODIMENT

Figure 1:
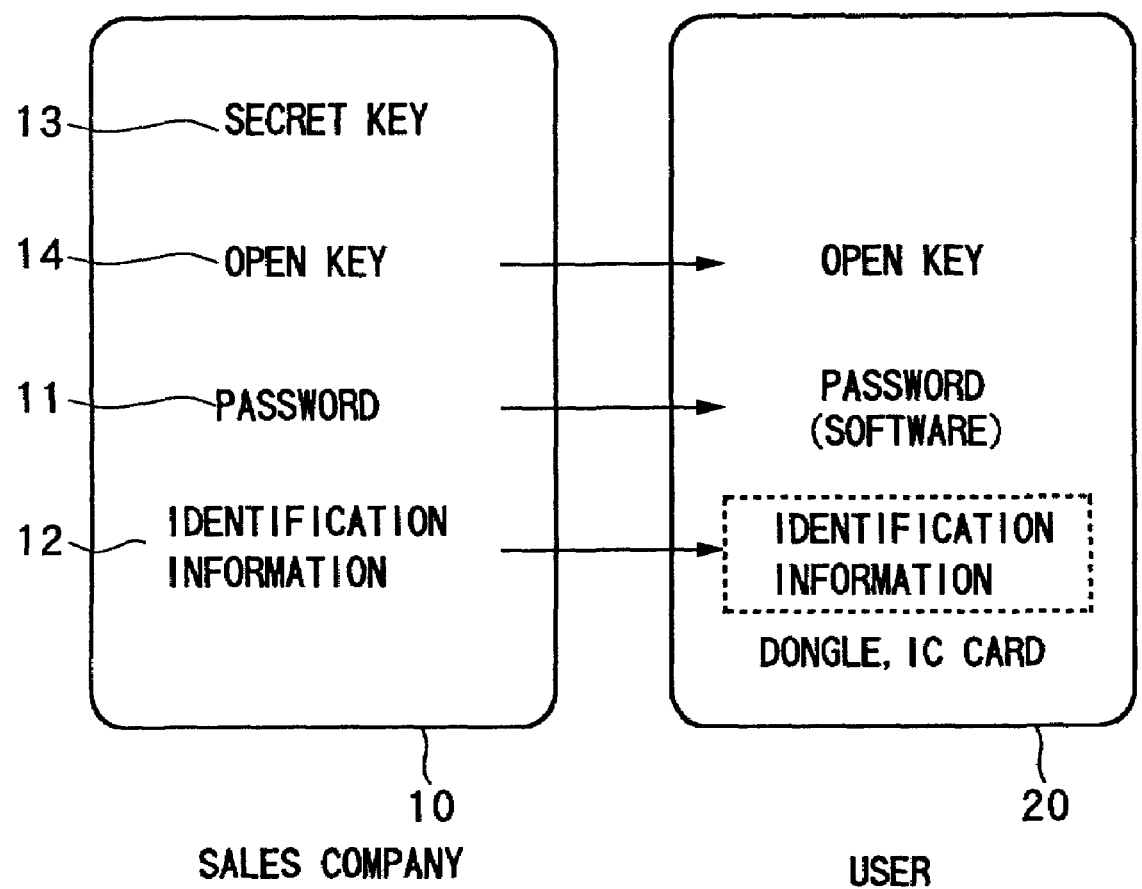
FIG. 1 illustrates preliminary processing of distribution in a program distribution system according to a preferred embodiment.

A preferred embodiment of the present invention will be explained with reference to FIGS. 1 to 6. The preferred embodiment will be illustrated by describing a procedure by which a software sales company may sell software to users of the software with reference to FIG. 1.

First, a sales company 10 adds a password 11 to software that can identify the software by a product number, label name, etc., or inserts specific identification information 12 determined in accordance with modes of software such as a product number, dongle number, validity period (whether there is permanent right of use or right of use with a time limit of use), etc. in a dongle and distributes it to a user 20.

At this time, the sales company 10 manages a relationship among the password 11, identification information 12, and the user 20 to whom the software is distributed. Particularly, the identification information 12 is managed in a secret state to the third party, i.e., the identification information is kept secret with respect to any third parties.

Next, the sales company 10 prepares a secret key 13 of an open key encoding mode only for the sales company and an open key 14 corresponding to it for the user 20. Then, the sales company 10 transfers the open key 14 corresponding to the secret key 13 to the user. The pair of keys 13, 14 including the secret key 13 and the open key 14 prepared by the sales company may be commonly used for every user 20 or prepared differently for groups of users 20 or for each individual user 20. If the key pair 13, 14 is made for common use among two or more users 20, management is easier than when a different key pair 13, 14 is prepared for each user 20, while the more differently prepared key pairs 13, 14 that are made relative to the number of users 20, the more that safety is improved. The sales company 10 can decide how to balance these countering considerations of ease of management and safety. Preferably, the open key 14 and secret key 13 to be used at this time use a digital signature method that is regarded as sufficiently safe.

Figure 2:
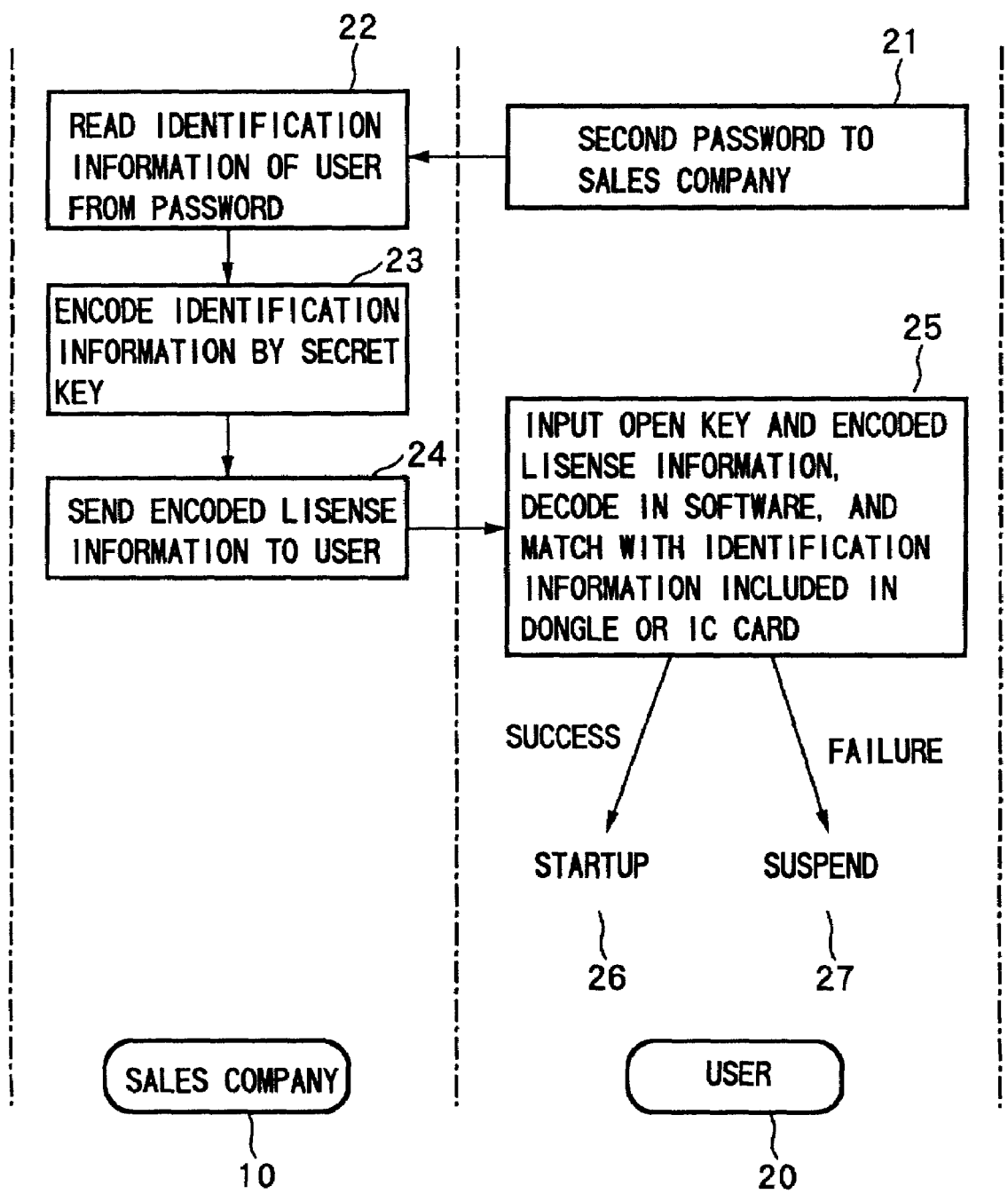
FIG. 2 further illustrates processing of a program distribution system according to a preferred embodiment.

Next, processing by which the user 20 actually obtains authorization of use and uses the software after completing the preliminary processing will be described with reference to FIG. 2. First, the user 20 transmits a password added to the software to the sales company 10 when trying to obtain a license, according to step 21. The sales company 10 searches through self-managed information according to the received password from the user 20 to detect and read of respective users in step 22. Next, the sales company 10 encodes the detected identification information by using a secret key of the sales company 10 to generate encoded license information in step 23. Then, the sales company 10 transmits the generated encoded license information to the respective users in step 24.

When receiving the encoded license information sent by the sales company 10 is step 24, the user 20 starts up the operation of the software and follows processing in the software to match the received encoded license information against identification information included in the a dongle or IC card in step 25. The software decodes the transmitted encoded license information by an open key and obtains the data corresponding to the password for respective users. Next, the software matches the license information against the identification information included in the dongle or IC card. When the information match, the software effectively starts to perform the desired processing according to step 26. However, when the information do not match, execution of the software is suspended according to step 27.

As above, in this preferred embodiment, a license is given by using the identification information included in the dongle or IC card. The information included in the dongle or IC card normally cannot be known or retrieved even by the user 20. Accordingly, it is possible to safely manage the use of the software in a desired form. In addition, the identification information which is transferred to the user in step 24 of FIG. 2 is in an encoded format, and this encoded license information is prepared only by the sales company 10 having the secret key. Therefore, even if a person learns the identification information, it is difficult to prepare encoded license information, so it is possible to manage licenses of software use with a high degree of security according to this preferred embodiment.

A more detailed explanation according to a specific example of the above embodiment is provided below. Note that in the description below, PN indicates a product number added to the software upon its sale, DID indicates a dongle ID number, PID a product ID number, CK a center secret key, UK a user open key, h a unidirectional hash function, and (R, L) encoding license information. Note also that a case of using a Schnoor signature method will be described here as preferred, although one skilled in the art would understand that other methods are available and would work with the preferred embodiment described above with respect to FIGS. 1-2.

Figure 3:
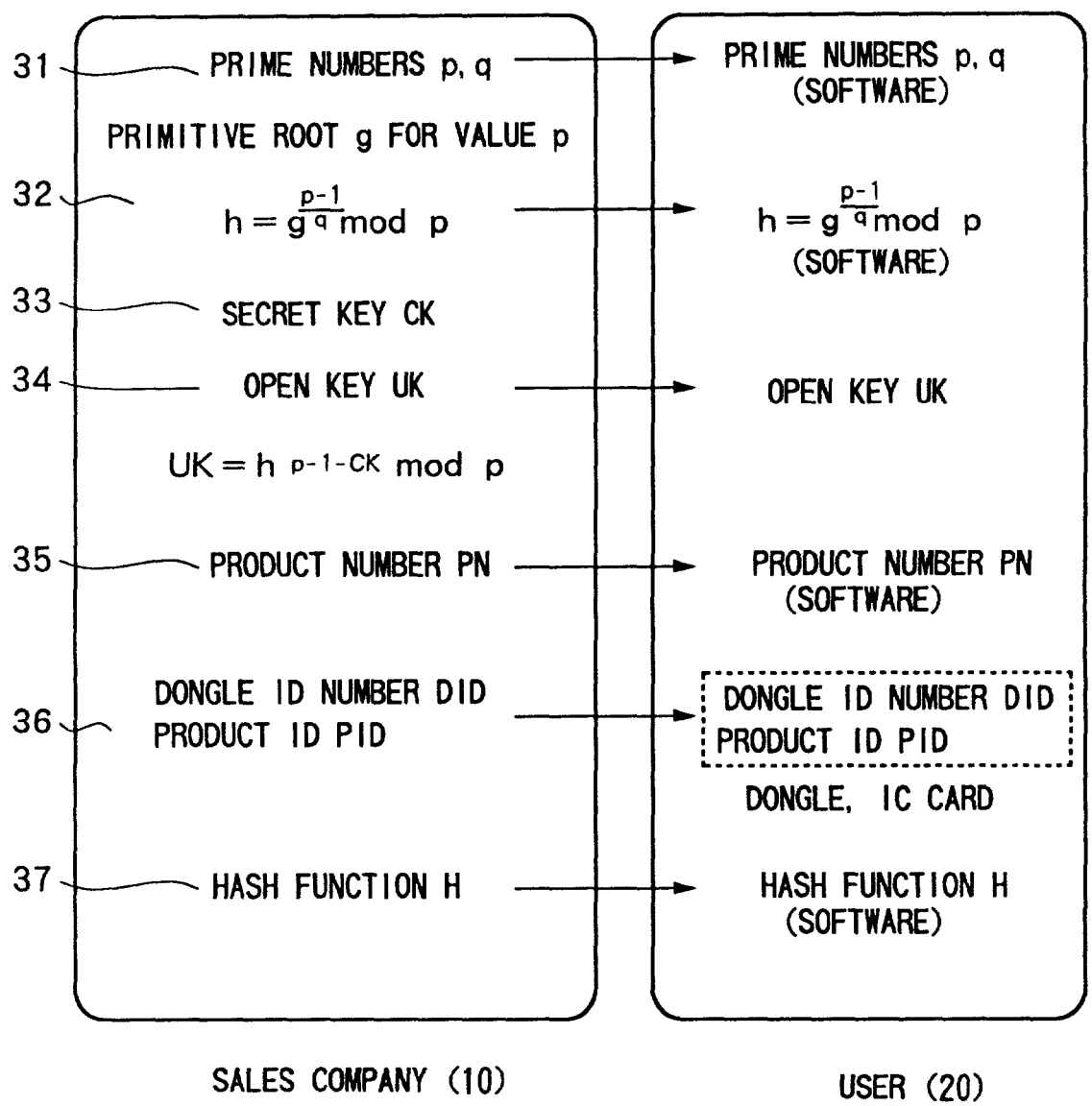
FIG. 3 further illustrates in an exemplary embodiment preliminary processing of distribution in a program distribution system according to a preferred embodiment.

First, preferred preliminary processing at the sales company 10 will be explained with reference to FIG. 3. A prime number q of about 32 bits is selected. Then, a large prime number p of about 1024 bits is selected making the prime number q a prime factor of (p−1). The obtained prime numbers p and q are recorded in the software and the dongle or IC card at step 31.

Figure 4:
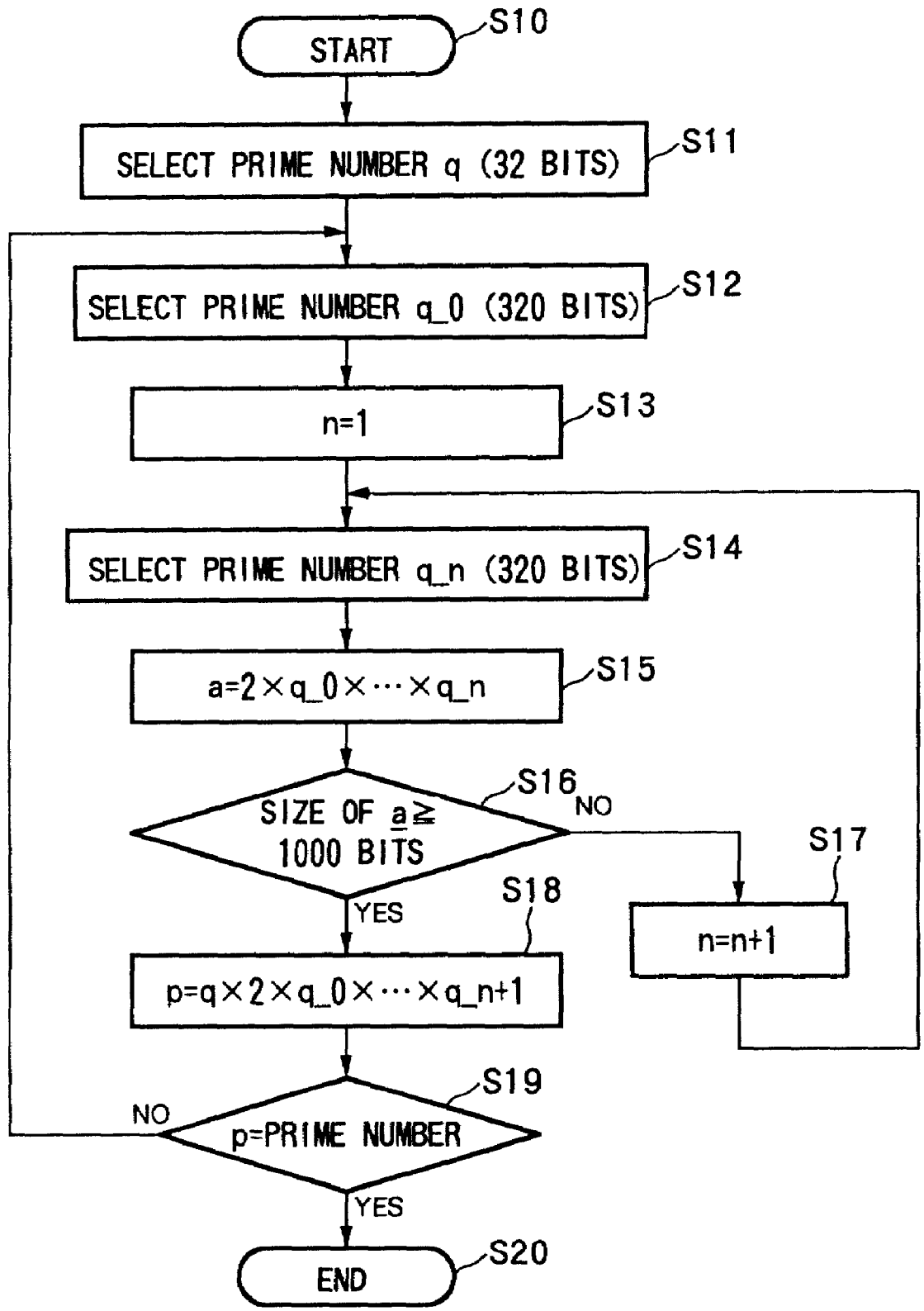
FIG. 4 is a flow chart for explaining processing for obtaining a prime number p in the exemplary embodiment of FIG. 3.

A preferred selecting method of the prime numbers q and p is described below with reference to FIG. 4. When the selecting processing starts at step S10 of FIG. 4, a prime number q of about 32 bits is selected by using a probability prime-number testing method such as the Rabin method at step S11. Next, the prime number $q\_0$ of about 320 bits is selected preferably in the same way by the probability prime-number testing method at step S12. Next, n=1 is set at step S13 and the prime number $q\_n$ is further selected in preferably the same way by using the probability prime-number testing method at step S14. Then, $a=2 \times q\_0 \times \ldots xq\_n$ is calculated at step S15. It is next checked whether the bit length of the calculation result a, which is defined as a probability prime-number testing parameter, reaches a predetermined bit length of about 1000 bits at step S16.

When the probability prime-number testing parameter a is determined to be less than 1000 bits at step S16, the index n is incremented up by 1 at step S17, and the procedure returns to the processing from step S14. Namely, a next prime number $q\_n$ is further selected at step S14, $a=2 \times q\_0 \times \ldots xq\_n$ is calculated at step S15, and whether or not a bit length of the probability prime-number testing parameter a reaches a predetermined bit length of about 1000 bits is checked at step S16. The loop may be repeated as many times as it takes until the probability prime-number testing parameter is determined to be about 1000 bits.

When the bit length of the probability prime-number testing parameter a reaches a predetermined bit length of about 1000 bits, as determined at step S16, by repeating the processing, $p=q \times 2 \times q\_0 \times \ldots xq\_n+1$ is calculated at step SI 8. Then, it is judged by the probability prime-number testing method whether an obtained value p is a prime number or not at step S19. When it is judged at step S19 that the obtained value p is not a prime number, the procedure returns to step S12 and processing from step S12 to step S18 is repeated for obtaining a new value p. These steps may be repeated as many times as it takes until the obtained value of p is determined at step S19 to be a prime number. When the obtained value p is determined at step S19 to be a prime number, the processing is ended at step S20.

Referring back now to FIG. 3, a primitive root g for the value p is selected, wherein $h=g^{(P-1)/q}x \bmod p$ is calculated, and this information is recorded in the software and the dongle according to step 32 of FIG. 3. The preferred processing for selecting the primitive root g is described below with reference to FIG. 5. Note that, in this description, it is defined that $p-1=r\_1 \times \ldots xr\_n$.

Figure 5:
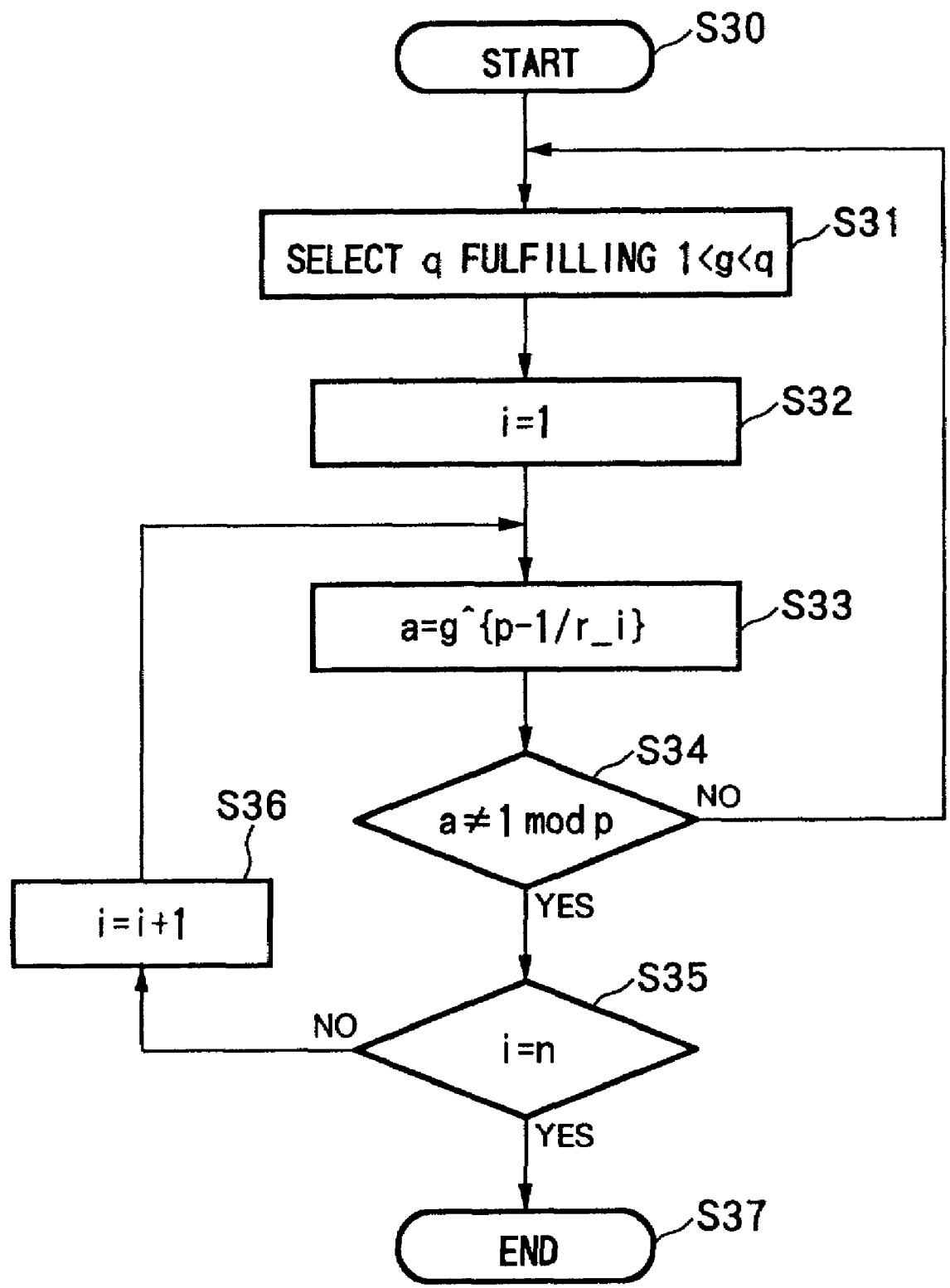
FIG. 5 is a flow chart for explaining processing for obtaining a primitive root g in the exemplary embodiment of FIG. 3.

First, after the processing is started at step S30 of FIG. 5, the primitive root g fulfilling 1<g<p is selected at random in step S31. Next, i=1 is set at step S32. Then, $a=g^{(p-1/r\_I)}$ is calculated at step S33 (where $g^\{p-1/r\_1\}$ indicates in step 33 shown at FIG. 5 that g is raised to the $\{(p-1)/r\_1\}$ power).

Now, whether the probability testing parameter a satisfies a≠1 mod p or not is checked at step S34.

When a=1 mod p stands as a result of the checking at step S34, the procedure returns to step S31, and the processing from selecting the primitive root g starts again, and the steps S31 through S34 are repeated until a≠1 modp is found as a result of checking at step S34. When a≠1 mod p, it is then checked whether all r_i are checked, that is, it is checked whether or not i=n at step S35. When it is determined that i≠n, then i is incremented at step S36, and the procedure returns to the step S33, and steps S33 through S35 are repeated until it is determined at step S35 that i=n, including incrementing at step S36 each time it is determined that i≠n at step S35. When all r_i are checked such that it is determined at step S35 than i=n, then the processing is ended by setting the primitive root g obtained at that time as an actual/primitive root at step S37.

Referring back now to FIG. 3, a secret key CK of the sales company is selected freely so as to satisfy 0<CK<q at step 33 of FIG. 3. The secret key CK is preferably stringently kept secret for sole use by the sales company 10. Next, a user key UK is calculated based on formula (1), below, about which the user 10 is notified at step 34. The user open key UK is preferably generated and the user 20 is notified at the time of sale of the software for the first time, then again each time the software is upgraded.

[Formula 1]:

$$UK=h^{(p-1-CK)}x \bmod p \qquad (1)$$

Next, a product number PN, a dongle ID number DID corresponding thereto, and a product ID number PID are recorded on a dongle at steps 35 and 36. The product ID number PID belongs to the software and is stringently kept for sole use by the sales company 10. A unidirectional Hash function H (1×value region of H×q) is prepared and recorded in the software and in the dongle at step 37. The above is the specific content of the preferred preliminary processing performed at the sales company 10.

Figure 6:
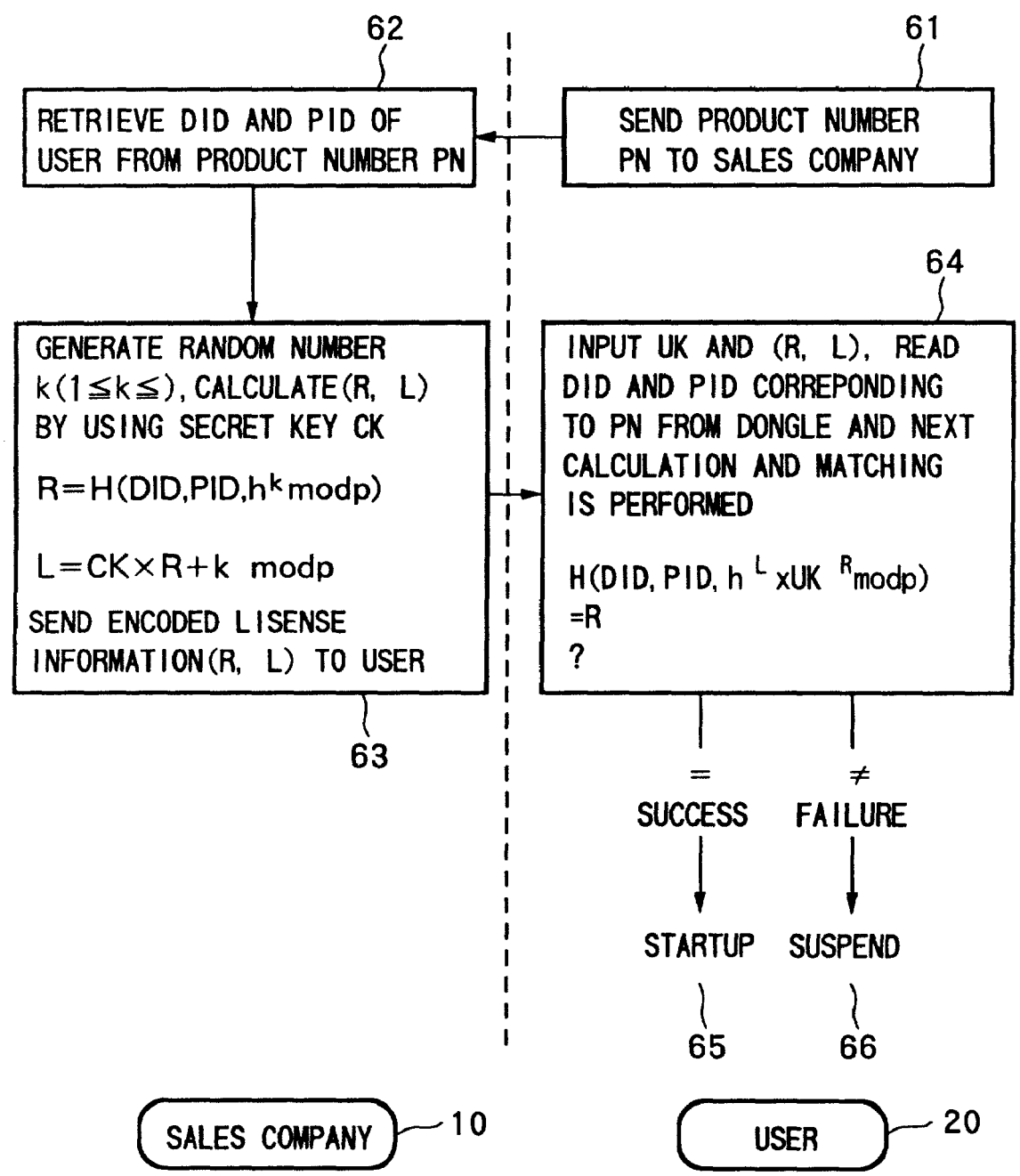
FIG. 6 illustrates in an exemplary embodiment processing of a program distribution system according to a preferred embodiment.

Next, a preferred method of managing licenses and managing execution of the software on the user's side will be specifically explained with reference to FIG. 6. First, the user transmits a product number PN to the sales company 10 when purchasing the software or updating an expiration date for using the software at step 61. The sales company obtains a DID and PID of the software of the user 20 at step 62 based on the product number PN transmitted by the user 20 to the sales company 10 at step 61. Next, the sales company 10 generates a random number k (1<k<q), generates encoded license information (R, L) in accordance with Formula 2, below, and transmits the same to the user at step 63.

[Formula 2]:

$$R=H(DID, PID, h^k \bmod p), \text{ for } 0<R<q, \text{ and } L=CK \times R+ k \bmod p \qquad (2)$$

The user uses the received encoded license information (R, L) and the product number PN and reads from the dongle a DID and PID corresponding to the production number PN to perform matching as shown in the formula 3, below at step 64.

[Formula 3]:

$$H(DID, PID, H^L \times UK^R \bmod p)=R \qquad (3)$$

Then, when Formula 3 holds, the matching is determined to be a success, the user 20 is confirmed to be an appropriate user and the operation of the program is made to be validly run at step 65. However, when Formula 3 does not hold and the matching fails, then operation of the program is stopped at step 66. The above embodiment can thus be implemented by the preferred specific processing set forth above.

Note that the present invention is not limited to the preferred embodiment set forth herein, and a variety of modifications can be made within the scope of the invention as set forth in the claims below, and equivalents thereof. For example, the preferred embodiment was described with respect to a license controlling method in the case of distributing a computer program as an example. However, the preferred embodiment may be applied to a variety of data uses other than programs, such as data in any system like a library or data having a functional structure. In addition, the preferred embodiment may be applied to programs and data used in a machine, system, etc. other than a computer.

Also, an example of using the Schnoor signature method was described in the above specific example, but another digital signature format may be used, such as an RSA signature, DSA signature, ElGmal signature, Fiat-Shamir signature, and an ellipse curve-based signature. Also, an example of particularly distributing a dongle with software was described in the preferred embodiment, but an IC card or other similar device known to those skilled in the art may be used instead of a dongle. Note that the processing of the sales company 10, the user 20, etc. were described in the above example, but the actual processing is preferably performed in an information processing apparatus on the sales company's side and an information processing apparatus on the user's side.

According to the preferred embodiment, the objects of the invention are met. That is, a method of managing software capable of managing software use with a high degree of safety and ease of handling upgrades or other changes is provided herein. Also, a software management system capable of managing software use with a high degree of safety and ease of handling upgrades or other changes is provided herein.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, the steps have been ordered in selected typographical sequences. However, the sequences have been selected and so ordered for typographical convenience and are not intended to imply any particular order for performing the steps, except for those claims wherein a particular ordering of steps is expressly set forth or understood by one of ordinary skill in the art as being necessary.

What is claimed is:

1. A method of managing software use by a software provider for distribution to a user, comprising the steps of:
    storing inside the software predetermined first information;
    providing the software to a software user on an information storage means prepared corresponding to the software and to be connected to an apparatus for running the software, which information storage means is capable of being accessed by the apparatus in a connected state;
    encoding second information by using a first key of a key pair of an open key encoding format; and
    transmitting the encoded second information to said software user for said software user to decode said transmitted encoded second information by using a second key of said key pair of said open key encoding format, and to read said first information from said information storage means, and to match said read first information against said decoded second information, wherein said software is enabled when the information match, and wherein the encoded second information is transmitted to the software user for matching the read first information against the decoded second information each time the software user uses said software.

2. A method of managing software use as set forth in claim 1, further comprising the steps of:

receiving predetermined third information identifying the software provided along with said software and said information storage means from the user when said user seeks authorization of use of said software;

identifying said software user based on said transmitted third information; and detecting second information to be matched against said first information stored in said information storage means given to the software user.

3. A method of managing software use as set forth in claim 2, wherein said first information and said second information are selected from the group of information consisting of identification information for identifying said software user, identification information for identifying said distributed software, and identification information for identifying said information storage means.

4. A method of managing software use as set forth in claim 3, wherein said first and second information is a password added to said software and said information storage means.

5. A method of enabling software by a user for software managed by a software provider, comprising the steps of:

receiving software in an information storage means prepared corresponding to the software, predetermined first information being stored in the software;

connecting said information storage means with an apparatus for running the software, which information storage means is capable of being accessed by the apparatus in said connected state;

receiving encoded second information from said software provider to be matched against said first information stored in said information storage means, said encoding performed by using a first key of a key pair of an open key encoding format;

decoding said transmitted encoded second information by using a second key of said key pair of the open key encoding format;

reading said first information from said information storage means; and matching said read first information against said decoded second information, wherein said software is enabled when the information match, and wherein the steps of receiving the encoded second information, decoding the transmitted encoded second information, reading the first information, and matching the read first information against the decoded second information are performed each time said software user uses the software.

6. A method of enabling software as set forth in claim 5, further comprising the steps of:

transmitting predetermined third information identifying the software provided along with said software and said information storage means when seeking authorization of use of said software, wherein said software provider identifies said software user based on said transmitted third information, and detects second information to be matched against said first information stored in said information storage means given to the software user.

7. A method of enabling software as set forth in claim 6, wherein said first information and said second information are selected from the group of information consisting of identification information for identifying said software user, identification information for identifying said distributed software, and identification information for identifying said information storage means.

8. A method of enabling software as set forth in claim 7, wherein said first and second information includes a password added to said software and said information storage means.

9. A system for enabling software stored in an information storage means for accessibly connecting via a predetermined interface means to an apparatus for running the software, said software having first information stored therein, comprising:

transmitting means for transmitting second identification information to a software provider when seeking authorization of use of said stored software;

receiving means for receiving encoded third information transmitted by said software provider to be matched against said first information generated based on said second information, said third information being encoded by a first key of a key pair of an open key encoding format;

decoding means for decoding said received encoded third information by using a second key of said key pair of the open key encoding format;

matching means for matching said first information stored in said information storage means against said decoded third information; and execution control means for enabling said software to be used when the information match, and wherein the encoded third information is received for matching against the first information each time a software user uses said software.

10. A system for managing software by a software provider, said software being stored in an in formation storage means to a provider for accessibly connecting via a predetermined interface means to an apparatus for running the software, said software having first information stored therein, comprising:

receiving means for receiving second identification information from a user seeking authorization of use of said stored software;

encoding means for encoding third information by using a first key of a key pair of an open key encoding format based on said second information;

transmitting means for transmitting the encoded third information to said user to be matched against said first information, wherein said first information stored in said information storage means is matched against said third information upon being decoded, and said software is enabled to be used when the information match, and wherein the encoded third information is transmitted for matching against the first information each time the user uses said software.

* * * * *